United States Patent
Iyer et al.

(10) Patent No.: US 7,372,849 B2
(45) Date of Patent: May 13, 2008

(54) PORT POLICY MANAGEMENT FOR CALLS IN A CENTRALIZED CALL CONTROL PACKET NETWORK

(75) Inventors: Ashok V. Iyer, Newport Beach, CA (US); Sahadevan P. Harikrishnan, San Jose, CA (US); Robert Glenn Synnestvedt, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 1050 days.

(21) Appl. No.: 10/272,320

(22) Filed: Oct. 15, 2002

(65) Prior Publication Data

US 2004/0071131 A1  Apr. 15, 2004

(51) Int. Cl.
  *H04L 12/28* (2006.01)
  *H04L 12/66* (2006.01)
(52) U.S. Cl. ............... 370/353; 370/356; 370/401; 370/410; 370/467
(58) Field of Classification Search ............... 370/401, 370/410, 467, 353, 356
  See application file for complete search history.

(56) References Cited

U.S. PATENT DOCUMENTS

| | | | | |
|---|---|---|---|---|
| 5,640,446 A * | 6/1997 | Everett et al. | ......... | 379/114.28 |
| 5,852,630 A * | 12/1998 | Langberg et al. | ........... | 375/219 |
| 6,141,345 A * | 10/2000 | Goeddel et al. | ............ | 370/389 |
| 6,233,234 B1 * | 5/2001 | Curry et al. | ................ | 370/356 |
| 6,324,183 B1 | 11/2001 | Miller et al. | ................ | 370/467 |
| 6,370,142 B1 * | 4/2002 | Pitcher et al. | .............. | 370/390 |
| 6,405,251 B1 * | 6/2002 | Bullard et al. | .............. | 709/224 |
| 6,466,977 B1 * | 10/2002 | Sitaraman et al. | .......... | 709/225 |
| 6,490,275 B1 * | 12/2002 | Sengodan | .................... | 370/356 |
| 6,614,781 B1 * | 9/2003 | Elliott et al. | ................ | 370/352 |
| 6,728,236 B2 * | 4/2004 | Potter et al. | ................ | 370/352 |
| 6,856,676 B1 * | 2/2005 | Pirot et al. | ............. | 379/201.01 |
| 6,961,857 B1 * | 11/2005 | Floryanzia | ................... | 726/14 |
| 6,999,912 B2 * | 2/2006 | Loisey et al. | ................. | 703/21 |
| 7,050,414 B2 * | 5/2006 | Lin | ........................... | 370/338 |
| 7,058,068 B2 * | 6/2006 | Gawargy et al. | ............ | 370/410 |
| 7,072,354 B1 * | 7/2006 | Beathard | .................... | 370/447 |
| 7,162,540 B2 * | 1/2007 | Jasen et al. | ................ | 709/242 |
| 7,209,457 B1 * | 4/2007 | Leuca et al. | ................ | 370/328 |
| 7,218,613 B1 * | 5/2007 | Doskow et al. | ............. | 370/252 |

FOREIGN PATENT DOCUMENTS

WO  WO 200067428 A1 * 11/2000
WO  WO 02/05068 A2  1/2002

OTHER PUBLICATIONS

Lakshmi-Ratan et al., "The Lucent Technologies Softswitch-realizing the promise of convergence", Apr.-Jun. 1999, Bell Labs Technical Journal, p. 174-195.*
Whang et al., "Voice over PacketStar/sup TM/ gateway solution for service provider networks", Oct.-Dec. 1998, Bell Labs Technical Journal, p. 103-123*

* cited by examiner

*Primary Examiner*—Hassan Kizou
*Assistant Examiner*—Brian T O'Connor
(74) *Attorney, Agent, or Firm*—Marger Johnson & McCollom, P.C.

(57) ABSTRACT

A network device is disclosed. The network device comprises a port to allow reception of a TCAP query. A processor translates the TCAP query into a dial access request and a port allows transmission of the dial access request and to receive a call disposition message.

22 Claims, 3 Drawing Sheets

PORT POLICY MANAGEMENT FOR CALLS IN A CENTRALIZED CALL CONTROL PACKET NETWORK

BACKGROUND

1. Field

This disclosure relates to port policy management in a centralized call control packet network, more particularly to managing communications between policy systems and Softswitches/Call Agents to manage calls.

2. Background

Signaling system 7 (SS7) was developed by the International Telecommunications Union (ITU) to specify a protocol for call establishment and teardown from exchange to exchange in a public switched telephone network (PSTN). SS7 is a powerful form of common channel signaling (CCS), which allows information about a phone call to be carried separately from the actual phone call itself. The phone call, comprised of audio signals from one party to another, can be carried on the bearer channel or voice circuit. The signals to establish the call and teardown the call are carried on separate circuits to keep the voice circuits free. This prevents calls that cannot be completed, such as those where the destination phone is busy, from tying up the voice circuits. Other types of call signaling can be used, such as PRI (primary rate interface) and CAS (channel assisted signaling).

With the advent of packet network telephony, where telephone call data is carried across packet networks, such as Internet Protocol (IP) networks, an interface was needed to allow the PSTN system to interface with the data network. These interfaces are often referred to as 'Softswitches,' short for software switches. The term 'call agent' may also be used and those two terms will be used interchangeable in this discussion. The Softswitch translates the control signals from the PSTN, such as those using SS7 signaling, to the signals used in the packet network, such as IP signaling. Generally, Softswitches are concerned with call control and service intelligence for PSTN and packet networks.

However, as the use of packet networks for telephony has increased, the need for more tightly controlled management of the resources of the telephony network has increased. The wholesalers, the entities that actually own the packet networks, want better control of the network resources in order to provide a legally binding level of service to the providers, who are the entities that offer users' access to the networks. For example, AT&T may own the actual wires across which the data is running, and AOL may provide the users access to the network for Voice over IP phone calls. The dimensions of AOL's access to the circuits may be governed by a service level agreement (SLA) between AOL and AT&T. In addition, AT&T may have other controls it may want to impose on the network, such as the number of users from any provider allowed to access the network from a particular point-of-presence (POP). These policies need to be enforced network wide.

However, currently, most policy systems are based upon dial protocols, such as Remote Authentication Dial-In User Service (RADIUS). The port policy management systems based on RADIUS protocol cannot be used easily by the Softswitch without significant modifications to the call control systems, as Softswitches are designed to handle voice calls, not dial calls. This prevents a network-wide policy enforcement for networks that includes Softswitch based solutions. Further, there are several Softswitch vendors, so it would be desirable to use a standardized form of providing the interface that would allow Softswitches from any vendor to interact with a policy system, based on a protocol that is supported by all the Softswitches in the market place.

SUMMARY

One aspect of the disclosure is a network device. The network device comprises a port to allow reception of a signaling system 7 TCAP query. A processor translates the SS7 TCAP query into an access request and a port that allows transmission of the access request and to receive a call disposition message.

Another aspect of the disclosure is a method of enforcing policy management on a Softswitch based architecture that may include interface to SS7 network. The method comprises receiving a new call from the TDM switch including PSTN, and translating the incoming call information to an access request in the form of a TCAP query message. The access request is then transmitted to a policy management system and a call disposition message is received in the form of TCAP query response.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
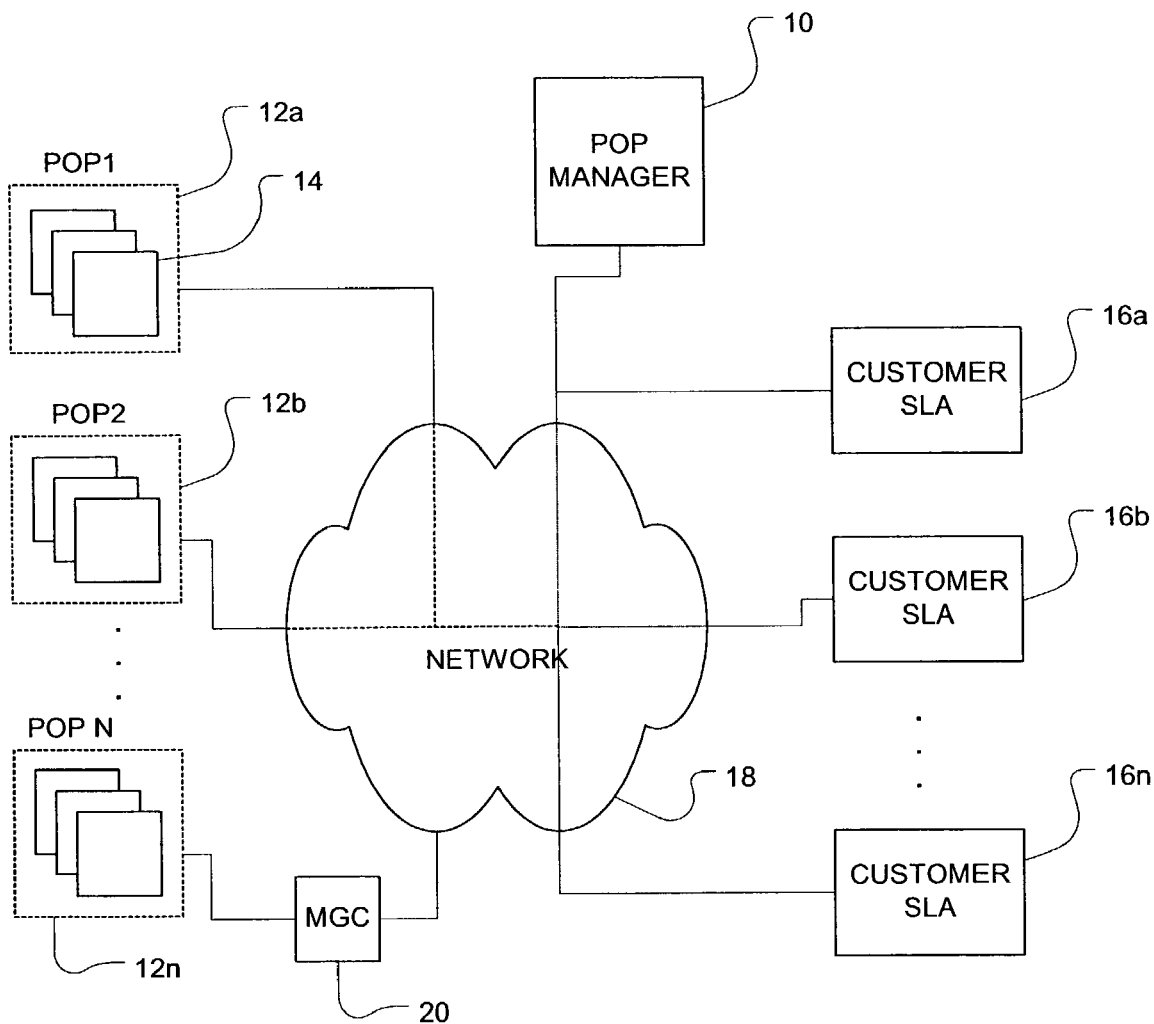
FIG. 1 shows an example of a network including a policy management system.

FIG. 1 shows a network having a policy management system. The term system as used here is not meant to imply any mandatory configuration or inclusion of any particular components. A policy system may be one device or a set of devices that manages various constraints on the network usage. A policy system may include port policy managers, service level agreement (SLA) managers, points-of-presence (POP) managers, etc. As shown in FIG. 1, the POP manager 10 and the three customer SLA managers 16*a*-*c* comprise the policy management system. Alternatively, the above functions may be combined in one or more servers, with each function being a separate software component on the server.

The users access the network 18 through the POPs 12*a*-12*n*. Each POP may have a gateway, such as 14, that allows access to the network and provides information to the policy system. For example, that particular POP may only be allowed to have 5,000 ports active at any one time. Similarly, a user may be associated with Customer 1, which may only have 15,000 users active at any one time across the entire network, by the terms of the SLA. When the users access the network through the gateways, the user information is transmitted to the policy system and the policy system either grants or denies the call.

However, POP 12*n* does not have a gateway that allows access to the data network directly, and that provides information to the policy system, as it is controlled by a softswitch 20, a Media Gateway Controller (MGC). The MGC must now communicate with the policy system in order for the enforcement of network wide policies. The RADIUS protocol used to communicate to the policy system is generally not supported in the MGC. This prevents the policy system from knowing the state of the entire network, and therefore does not allow policies to be instituted across the entire network. This does not afford the wholesalers to maintain the tight integrity desired between the policies and the actual state of the network. Softwitches typically include Advanced Intelligent Network (AIN) services. AIN services comply with a set of standards that allow new services to be added to existing networks with minimal upgrade costs and interference. An intelligent network separates service logic from the switching logic and concentrates services into dedicated network resources. The network resources are communicated with via the Transaction Capabilities Applications Part (TCAP) of SS7 signaling. It is possible to use these existing signals exchanged between a Service Switching Point (SSP) and a Service Control Point (SCP) to interface with the policy system, or to use the TCAP message and protocol for communications between MGC and a protocol converter.

Figure 2:
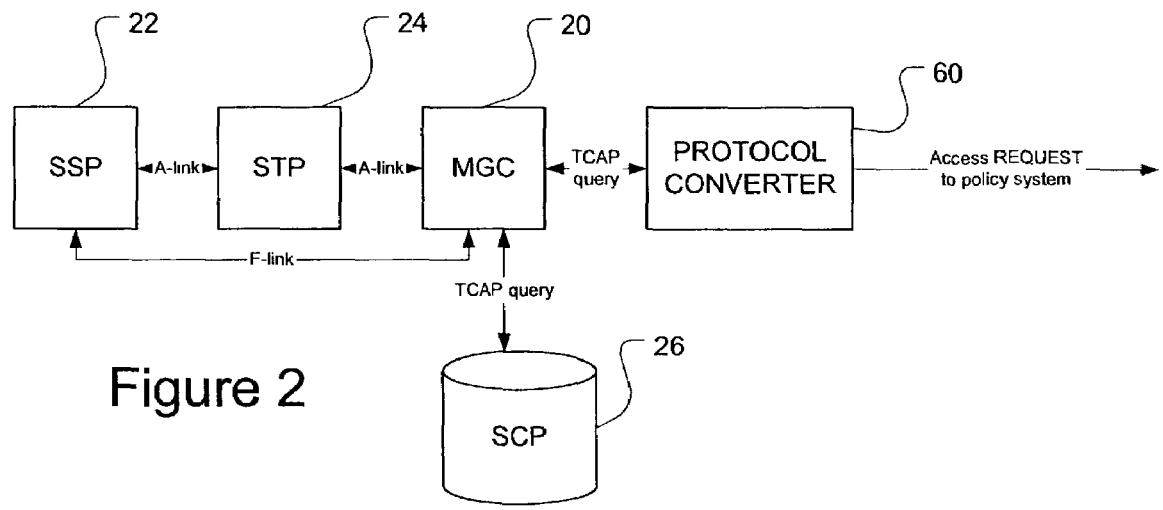
FIG. 2 shows an embodiment of a network portion having a softswitch and a service control point.

An example of a portion of a network including a protocol converter is shown in FIG. 2. The SSP 22 is a switch that originates and terminates calls. It would send signaling messages to other SSPs to set up, manage and release voice circuits required to complete a call. Signaling traffic between switching points may be routed via a packet switch called a Signal Transfer Point (STP), such as 24. The STP routes each incoming message to an outgoing signaling link based upon routing information contained in the SS7 message. The STP 24 is not required, and is only shown for the sake of completeness.

The SSP 22 receives an incoming call. The SSP may route the call to the STP 24 which would then route the call to the appropriate MGC 20. This would be done on what is referred to as an "A-link" which is a signaling channel not associated with any particular link carrying traffic. Alternatively, the SSP 22 would route the call directly to the MGC 20 on another channel referred to as an "F-link." An F-link is a link that is fully associated with a bearer channel, integrating bearer traffic and signal traffic.

The MGC 20 would determine that the call requires a policy decision, typically depending upon the source and destination information of the incoming call, such as the calling and called party number, etc. The MGC would then construct and send a TCAP message to the protocol converter 60. The protocol converter translates the incoming TCAP query to an outgoing access request that is usable by the RADIUS-based policy system. The protocol converter may reside within another network device, such as the MGC or the policy system making the decision to accept or reject the call.

Figure 3:
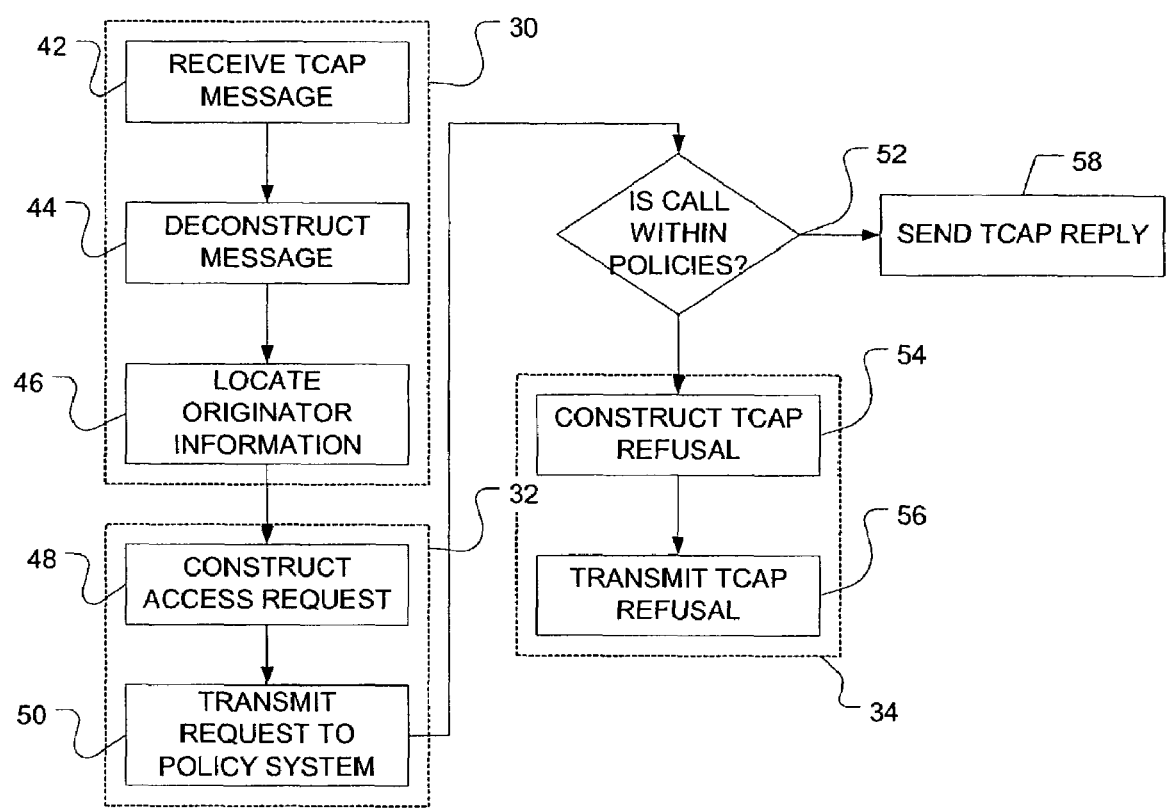
FIG. 3 shows a flowchart of one embodiment of a method to provide translation between TCAP query message and Access Policy Management message

It is possible that existing TCAP queries that are routinely sent between an MGC and the SCP could be used to indicate to the MGC that a protocol conversion is necessary. One such is a query from the MGC to a Service Control Point (SCP) 26. SCP 26 is essentially a database or group of databases that include routing information, such as toll-free call routing and local number portability routing. When the MGC 20 sends a message to the SCP 26, the message is sent in a TCAP message format. As can be seen in FIG. 2, the Softswitch 20 could use the TCAP query response message from the SCP and a trigger to generate the conversion to an access request that could then be managed by the policy system. In FIG. 3, a TCAP message is received at the protocol converter at 42. As mentioned before, the origination of this message is either the MGC recognizing that an incoming call needs policy approval, or triggered from some other event, such as an SCP query. This message indicates that a user is connecting from the SS7 portion of the network. The protocol converter deconstructs the message at 44 to determine from where the message came. This may include the number from which the call was placed, which in turn allows identification of the user, etc. Once the originator information is located at 46, the converter can determine the user and the associated provider, as well as the POP from which the user is accessing the network, etc.

The information is then used to construct an access request message at 48. The access request message is that message that allows the policy system to trigger any policies in place with regards to that customer, POP, port, etc. This message is then transmitted to the policy system at 50. At 52, the policy system then determines if the call can be granted under the current state of the network and the constraints of the various policies. For example, assume the user is associated with Customer 1 as the provider, and the provider SLA for Customer 1 says it can have 10,000 active users. If the user's call is call 10,001, it would be outside the policy and the call would be denied. If, however, Customer 1 has only 9,000 active users, the call is within the policy and the call is granted.

If the call is outside the policy at 52 and cannot be granted, the protocol converter would construct a TCAP message at 54 and transmit it at 56. In one embodiment, the denial would merely use already existing TCAP error messages, avoiding the addition of any new software to generate new error codes. The error message would then cause the Softswitch, such as MGC 20, to receive a standard message either responding with an answer or an error code, with the determination of which message is sent depending upon the call disposition message. Staying within the TCAP standard also provides better interoperability between Softswitches manufactured by different vendors. If the call were to be granted at 52, the Softswitch would be sent the standard TCAP reply at 58 that would typically indicate that the call is going through. The MGC or Softswitch would wait until receiving the call disposition message to proceed with the call.

As can be seen from FIG. 3, then, the general approach to allowing this interaction can be seen by the larger boxes of dashed lines. At 30, the TCAP message is received. At 32, the TCAP message is translated to an access request and transmitted to the policy system. The policy system then makes its determination at 52 and either grants the call at 58, or denies the call at 34. The message within which the call is either granted or denied will be referred to as a call disposition message. The more specific implementations inside the dashed boxes are for ease of understanding and are just one embodiment of implementing the TCAP to RADIUS interface.

In this manner, the policy system can monitor and enforce policies in Softswitch architectures including interface to SS7 networks without requiring any customized or non-standardized messages to be added. It also provides policy management capabilities to softswitches, which are typically only concerned with call control.

Figure 4:
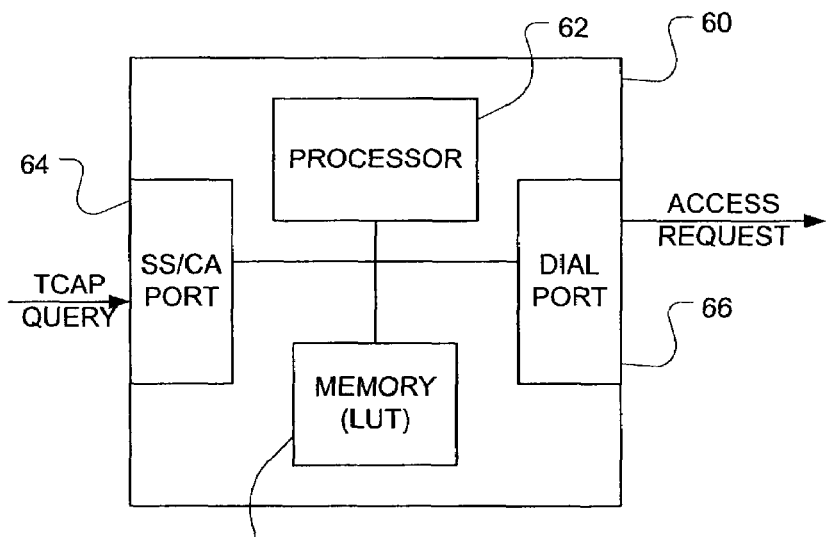
FIG. 4 shows an embodiment of a network device that interfaces between the Softswitch and policy management system by translating TCAP query messages to access request messages and vice versa.

Typically, this interface would be implemented in a network device as software instruction code. This machine executable code, when executed, would cause the machine to perform the method of the invention. The software could be provided in the MGC, a dedicated network device, or within a policy processor. An example of network device, which may or may not be a stand-alone device referred to here as a protocol converter, provides the interface to allow Softswitch based systems to interact with policy systems and is shown in FIG. 4.

The network device 60 includes a SS/CA (Softswitch/Call Agent) port 64 for receiving a TCAP request. The processor 62 then operates to deconstruct the message and translate it to an access request understandable to the policy system. The processor may be a general-purpose processor, a digital signal processor, a controller, an application specific integrated circuit, or a field-programmable gate array. The translation may involve a comparison of a TCAP message to a lookup table (LUT) in which is the corresponding access request parameters. This LUT would be contained in the memory 68, which may be on-board the processor 62. Once the translation has been performed, the access request is transmitted through the dial port 66. The two ports may actually be one physical port with the two interfaces determining whether the port is a SS/CA port or a dial port, depending upon which interface has control of the physical port.

Thus, although there has been described to this point a particular embodiment for a method and apparatus for an interface between a Softswitch based network and a policy system, it is not intended that such specific references be considered as limitations upon the scope of this invention except in-so-far as set forth in the following claims.

What is claimed is:

1. A network device, comprising:
a first port to allow reception of a TCAP query from a point-of-presence (POP) and to allow transmission of a TCAP query response to the POP;
a processor to translate the TCAP query into an access request, the access request comprising an identification of a service provider; and
a second port to allow transmission of the access request to a policy management system and to receive a call disposition message from the policy management system, wherein the call disposition message is based on network conditions, the identification of the service provider, and a service level agreement associated with the service provider.

2. The network device of claim 1 wherein the TCAP query response comprises an error message.

3. The network device of claim 1 wherein the network device further comprises a memory.

4. The network device of claim 3, wherein the memory includes a lookup table that provides a translation between TCAP messages and access request messages.

5. The network device of claim 1, wherein the network device is a media gateway controller.

6. The network device of claim 1, wherein the network device is a policy processor.

7. A method of enforcing policy management on a Softswitch based network, the method comprising:
receiving a transaction capability application part (TCAP) query from a point-of-presence (POP);
translating the TCAP query to an access request, the access request comprising an identification of a service provider;
transmitting the access request to a policy management system;
receiving a call disposition message from the policy management system, the call disposition message based on network conditions, the identification of the service provider, and a service level agreement associated with the service provider;
translating the call disposition message to a TCAP query response; and
transmitting the TCAP query response to the POP.

8. The method of claim 7, wherein receiving the TCAP query further comprises:
deconstructing the query;
locating originator information; and
determining an originator's service provider and the point-of-presence (POP) from which the originator is accessing the network from the originator information.

9. The method of claim 7, wherein translating the TCAP query to an access request further comprises:
constructing the access request using originator information located inside the TCAP query; and
transmitting the access request to a policy system.

10. The method of claim 7, wherein the TCAP response further comprises a TCAP error code.

11. A network device, comprising:
a means for allowing reception of a TCAP query from a point-of-presence (POP);
a means for translating the TCAP query into an access request, the access request comprising an identification of a service provider; and
a means for allowing transmission of the access request to a policy management system and to receive a call disposition message from the policy management system, wherein the call disposition message is based on network conditions, the identification of the service provider, and a service level agreement associated with the service provider.

12. The network device of claim 11 wherein the means for allowing reception of a TCAP query further allows transmission of a TCAP query response and the TCAP query response comprises an error message.

13. The network device of claim 11 wherein the network device further comprises a means for storing data.

14. The network device of claim 13, wherein the means for storing data further comprises a lookup table that provides a translation between TCAP messages and access request messages.

15. The network device of claim 11, wherein the network device is a media gateway controller.

16. The network device of claim 11, wherein the network device is a policy processor.

17. A computer readable medium containing machine-executable code that, when executed, causes the machine to:
receive a translation capability application part (TCAP) query from a point-of-presence (POP);
translate the TCAP query to an access request, the access request comprising an identification of a service provider;
transmit the access request to a policy management system;
receive a call disposition message from the policy management system, the call disposition message based on network conditions, the identification of the service provider, and a service level agreement associated with the service provider; and
translate the call disposition message to a TCAP query response; and
transmit the TCAP query response to the POP.

18. The computer readable medium of claim 17 wherein the code causing the machine to receive the TCAP query further causes the machine to:

deconstruct the query; and locate originator information.

19. The computer readable medium of claim 17 wherein the code causing the machine to translate the TCAP query further causes the machine to:

construct an access request using originator information located inside the TCAP query; and transmit the access request to a policy system.

20. The computer readable medium of claim 17, wherein the machine is a protocol converter.

21. The computer readable medium of claim 17, wherein the machine is a media gateway controller.

22. The computer readable medium of claim 17, wherein the machine is a policy processor.

* * * * *